United States Patent [19]

Lambert

[11] 4,449,572
[45] May 22, 1984

[54] SUBTERRANEAN HEATING AND COOLING SYSTEM

[75] Inventor: Roland Lambert, Longwood, Fla.

[73] Assignee: Ladek Corporation, Longwood, Fla.

[21] Appl. No.: 460,186

[22] Filed: Jan. 24, 1983

Related U.S. Application Data

[60] Division of Ser. No. 248,427, Mar. 27, 1981, Pat. No. 4,369,635, which is a continuation-in-part of Ser. No. 51,405, Jun. 25, 1979, Pat. No. 4,279,291.

[51] Int. Cl.³ .............................................. F24J 3/02
[52] U.S. Cl. ......................................... 165/1; 62/260; 165/45; 165/108; 237/1 R
[58] Field of Search ............... 165/45, 1, 108; 62/260; 237/1 R

[56] References Cited

U.S. PATENT DOCUMENTS

| | | | |
|---|---|---|---|
| 2,564,215 | 8/1951 | Slane | 165/45 |
| 4,049,407 | 9/1977 | Bottum | 165/45 X |
| 4,259,401 | 3/1981 | Chahroudi et al. | 165/45 X |
| 4,384,609 | 5/1983 | Neuzil | 165/45 |

FOREIGN PATENT DOCUMENTS

| | | | |
|---|---|---|---|
| 803541 | 10/1936 | France | 165/45 |
| 248161 | 1/1948 | Switzerland | 165/45 |

*Primary Examiner*—Sheldon J. Richter
*Attorney, Agent, or Firm*—Kokjer, Kircher, Bradley, Wharton, Bowman & Johnson

[57] ABSTRACT

A method and equipment for increasing the efficiency of a heat pump is the subject of the present invention. The method comprises providing an underground pathway for air travel, forcing a quantity of air through the pathway for operation of the heat pump, and directing air emanating from the underground pathway to the heat pump inlet. The equipment of the invention comprises a heat pump, an underground conduit presenting an elongated path for accommodating the flow of air therethrough for heat exchange purposes with the earth, with the outlet of the underground conduit being disposed for directing air toward the heat pump.

3 Claims, 3 Drawing Figures

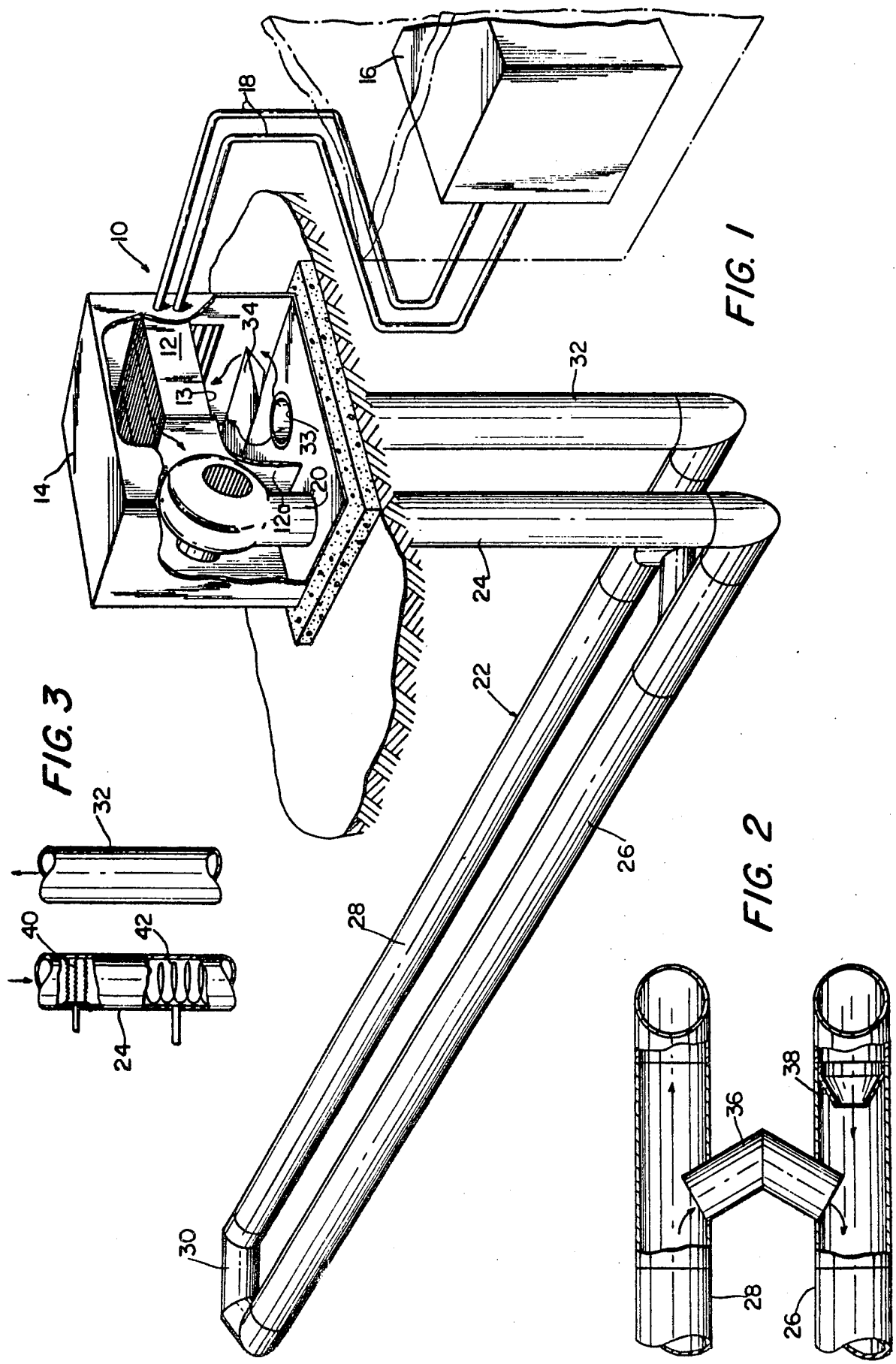

SUBTERRANEAN HEATING AND COOLING SYSTEM

This is a division of application Ser. No. 248,427, filed Mar. 27, 1981, now U.S. Pat. No. 4,369,635 issued Jan. 25, 1983, which is a continuation-in-part of application Ser. No. 51,405, filed June 25, 1979, now U.S. Pat. No. 4,279,291 issued July 21, 1981.

This invention relates in general to heating systems and, more particularly, with an improved heat pump and method of utilizing same.

My co-pending application discloses and claims an improved subterranean heating and cooling system which has highly improved operating characteristics as a result of a unique recycling feature. This feature allows the length of the conduit to be substantially shortened while increasing the effective length of the path of travel of the air in heat exchange relationship with the ground.

The utilization of heat pumps for heating buildings has been practiced for at least 20 years. The early heat pumps were little more than air conditioners which ran in reverse. Many failures were recorded and the heat pump lost much of its market during the decade of the 1960's. In more recent time, however, improved heat pumps have resulted in a resurgence of the market. The continuing shortage of fossil based fuels has also increased the demand. The basic problem encountered with a heat pump is that its efficiency drops markedly as the outside temperature drops. The Coefficient Of Performance (COP) of a heat pump is likely to be in the vicinity of 3 when the outside temperature is 50° F. This means that the heat pump will deliver 3 BTU's for every BTU of electricity put into it. The same heat pump would likely have a COP of no greater than 2 when the mercury drops to the freezing point and at 15° F., the COP would likely be mere 1. When temperatures of 15° F. or below are encountered, most heat pumps are provided with cutouts which will shut down the compressor or limit its operation and shift the major heating job to backup electrical resistance heaters. This, of course, dramatically increases the cost of operating the heat pump and in fact makes its operation impractical for many climates. It is also a major factor in limiting the useful life of a heat pump.

It is, therefore, a primary object of the present invention to provide greater heat pump efficiency by preconditioning the air from which heat is to be extracted by circulating it in heat exchange relationship with the ground prior to passing it through the heat pump.

A major objective of the invention is to reduce the need for a heat pump to rely upon expensive auxiliary resistance heating by providing partially pre-heated air on which the heat pump acts to extract heat.

A primary aim of the invention is to increase the life of a heat pump by reducing compressor operating time as a result of pre-heating the air on which the compressor acts.

It is also a principal objective of my invention to provide a system of increasing heat pump efficiency by utilizing pre-heated air on which the heat pump acts so as to make the heat pump utilizable in climates where it has heretofore been impractical to do so.

A further aim of the invention is to provide a method of heating and cooling a building wherein the source of heating or cooling is located underground and the ground is utilized as an energy storing sink from which heating or cooling may be extracted as needed.

Other objects of the invention will be made clear or become apparent from the following description and claims when read in light of the accompanying drawing wherein:

FIG. 1 is a perspective view of the heat pump system according to the present invention;

FIG. 2 is a vertical cross-sectional view illustrating details of construction of the underground conduit through which air passes; and FIG. 3 is a fragmentary elevational view showing an alternative form of the invention.

Referring initially to FIG. 1, the heating system of the present invention is designated generally by the numeral 10 and includes a heat pump 12 disposed within a housing 14. The area of the heat pump inlet is designated by the number 13. The compressor for the heat pump 12 is located outside of the building inside of housing 14 and an expansion coil for heat exchange with air inside of the building is disposed in a second housing 16. Insulated lines 18 carry the compressible heat exchange liquid between the compressor and the expansion coil.

An auxiliary fan 20 is coupled with an underground conduit designated generally by the numeral 22. Conduit 22 includes a first vertical leg 24 coupled directly with the output of fan 20. Vertical leg 24 merges into a first horizontal stretch 26 which is coupled with a second parallel horizontal stretch 28 by a U-shaped end stretch 30. Horizontal stretch 28 is in communication with a second vertical leg 32 having its outlet 33 inside of housing 14 and directly in communication with the inlet for heat pump 12. Housing 12a of the heat pump serves to couple the outlet 33 with the heat pump inlet.

Referring to FIG. 2, it is seen that a cross-over conduit 36 couples the two horizontal stretches 26 and 28. One end of conduit 36 projects into conduit stretch 28 so as to present a deflector which will divert a portion of the air into the cross-over conduit. The opposite end of the cross-over conduit 36 projects into conduit stretch 26 providing a restrictor in this conduit which serves to increase the velocity of air in the vicinity of the cross-over conduit. The velocity is further increased by a venturi collar 38 disposed adjacent to the end of cross-over conduit 36 and slightly upstream from the latter. The increase in velocity in the vicinity of cross-over conduit 36 causes a slight decrease in pressure inside of this conduit thereby enhancing the recycling feature.

During normal operation of the equipment of the present invention, the heat pump fan (not shown) which would normally form a part of the heat pump device is inactivated and replaced by auxiliary fan 20. Fan 20 is selected to have a capacity sufficient to supply the heat pump with the needed volume of air for operation under selected conditions. Thus, fan 20 is activated to force air through conduit 22 where it will undergo heat exchange with the ground. The horizontal stretches of conduit 22 are disposed beneath the ground a sufficient distance so that the temperature is substantially constant. In most areas of the country, a temperature of 55°–60° F. is obtained year-round at a depth of 3–10 feet. By virtue of the cross-over conduit 36 and the recycling feature attributable to it, the length of conduit 22 may be substantially reduced over what would otherwise be required. A substantial portion of the total volume of air passing through the conduit is constantly recycled causing it to repeatedly be in heat exchange relationship with the relatively warm surrounding ground. The air emanating from outlet 33 passes to the inlet for the heat pump where the air is utilized to extract heat which is then transferred to the heat exchange coil inside of the building to be heated.

By virtue of the fact that air entering the heat pump inlet is substantially warmed over what would otherwise be encountered at normal outside temperatures, the heat pump is required to work less to extract the desired amount of heat. This increases the efficiency of the heat pump and greatly reduces the need for reliance upon auxiliary resistance heaters when the outside air temperature drops substantially below freezing. In many instances, the utilization of the method and equipment of the present invention will result in the heat pump being practical in cold climates where it otherwise could not be economically utilized.

An alternative form of the invention is illustrated in FIG. 3. Construction of this embodiment is identical to the preferred embodiment described above except that a heating element 40 and a cooling coil 42 are both disposed in first vertical leg 24. Heating element 40 is coupled with an appropriate energy source and cooling coil 42 is coupled with a compressor in a conventional manner. The term "heat exchanger" is used herein to refer generically to either heating element 40 or cooling coil 42. Manifestly, when a heat exchanger is located in conduit 24, as shown in FIG. 3, it is not necessary to have another heat exchanger in a conventional above-ground location. That is, the heat exchangers 40 and 42 take the place of the heat exchangers which would normally be present in either a heat pump, air conditioner or other heating or cooling source. In the alternative form of the invention, conduit 32 would be provided with a "Y" or "T" coupling so that at least a portion of the air emanating from vertical conduit 32 is directed across heat exchanger 40 or 42. The remainder of the air from conduit 32 may be passed directly into the building.

It has been found that by placing the heat exchanger in the vertical conduit, the heat exchange unit may be operated for a relatively short period of time during which cold or heat will be transferred to the surrounding earth. The earth acts as a heat or cold sink where the energy may be stored until it is brought into the adjacent building. In this manner, the efficiency of the heat exchanger is increased by warming or cooling the building more gradually through the utilization of the method as herein disclosed than would be the case if the heating or cooling element was positioned for direct heat exchange with the building. Another advantage of the alternative embodiment of the invention is that the heat exchanger may be operated during non-peak utility demand periods thus lessening the demand load on the utility and offering savings to the consumer.

It should also be appreciated that the apparatus and method of the present invention could find application in conjunction with an underground system of the type disclosed in my co-pending application. By placing a "y" in the conduit stretches 26 and 28 (or their vertical extensions), an auxiliary conduit may be run directly to housing 16. An appropriate baffle will control air flow either to the inside housing 16 or the heat pump housing 14. When air is directed to the inside of the building, it may be used as an independent cooling system or in conjunction with an air conditioner.

From the foregoing, it will be apparent that the invention encompasses a method of operating a heat pump which extracts heat from the outside air comprising the steps of providing an underground pathway for air travel, forcing a quantity of air through the pathway for operation of the heat pump, and directing air emanating from the underground pathway to the heat pump where it is acted upon by the heat pump. The method includes coupling the underground conduit directly with the heat pump inlet and also locating the underground pathway at a level beneath the surface of the ground where the temperature is substantially constant. Finally, it is within the scope of the present invention to include within the method steps the step of recycling a portion of the air traveling along the underground pathway and increasing the velocity of the recycled air as the latter commences travel along the pathway.

I claim:

1. A method of heating or cooling a building utilizing a heat exchanger and a source of forced air for passing over said heat exchanger, said method comprising the steps of:
    providing an underground pathway for air travel, said pathway having an inlet and an outlet;
    locating said heat exchanger in said underground pathway;
    forcing a quantity of air through said pathway;
    recycling a portion of the air traveling along said pathway;
    increasing the velocity of said recycled air as the latter commences travel along said pathway; and
    directing air emanating from said pathway outlet to said building.

2. A method as set forth in claim 1, wherein said step of providing an underground pathway comprises locating said pathway at a level beneath the surface of the ground where the temperature is substantially constant.

3. A method as set forth in claim 1, wherein said heat exchange comprises a heat pump.

* * * * *